US012118508B2

(12) United States Patent
Post et al.

(10) Patent No.: US 12,118,508 B2
(45) Date of Patent: Oct. 15, 2024

(54) METHOD AND WAREHOUSE FOR DELIVERY ORDER PROCESSING

(71) Applicant: Dematic Corp., Grand Rapids, MI (US)

(72) Inventors: Timothy C. Post, Grand Rapids, MI (US); Brett D. Webster, Austin, TX (US)

(73) Assignee: Dematic Corp., Grand Rapids, MI (US)

( * ) Notice: Subject to any disclaimer, the term of this patent is extended or adjusted under 35 U.S.C. 154(b) by 178 days.

(21) Appl. No.: 17/702,252

(22) Filed: Mar. 23, 2022

(65) Prior Publication Data

US 2022/0309446 A1 Sep. 29, 2022

Related U.S. Application Data

(60) Provisional application No. 63/166,561, filed on Mar. 26, 2021.

(51) Int. Cl.
*G06Q 10/087* (2023.01)
*G06Q 10/0832* (2023.01)
*G06Q 10/0833* (2023.01)

(52) U.S. Cl.
CPC ....... *G06Q 10/087* (2013.01); *G06Q 10/0832* (2013.01); *G06Q 10/0833* (2013.01)

(58) Field of Classification Search
CPC ............. G06Q 10/087; G06Q 10/0832; G06Q 10/0833
See application file for complete search history.

(56) References Cited

U.S. PATENT DOCUMENTS

| | | | | |
|---|---|---|---|---|
| 9,152,943 | B2* | 10/2015 | Joao | G06Q 10/105 |
| 11,001,445 | B2 | 5/2021 | Hoffman | |
| 11,276,028 | B2* | 3/2022 | Chopra | G06N 3/084 |
| 11,905,058 | B2* | 2/2024 | Lert, Jr. | G06Q 10/06315 |
| 2013/0096735 | A1* | 4/2013 | Byford | G05D 1/0234 |
| | | | | 701/28 |
| 2014/0279294 | A1* | 9/2014 | Field-Darragh | H04B 5/77 |
| | | | | 705/28 |
| 2020/0184437 | A1 | 6/2020 | Kelly et al. | |

\* cited by examiner

*Primary Examiner* — Paul Danneman
(74) *Attorney, Agent, or Firm* — Gardner, Linn, Burkhart & Ondersma LLP

(57) ABSTRACT

A method for operating an order fulfilment warehouse utilizing a gig-based labor force (e.g. freelance delivery drivers) performing picking functions in the warehouse and subsequently delivering the order to the customer. Preferably, the facility is staffed with only supervisory labor and receiving/putaway labor to replenish the warehouse inventory. The delivery driver may access an order database via a mobile application to accept a customer's online order, such as a grocery item order. The customer's order may additionally include retrieving items from another facility, such as a restaurant. The grocery order may be from a limited or dedicated warehouse facility that has a curated group of items/SKUs. The delivery driver enters the warehouse, checks in, and then proceeds to pick the order from the warehouse. The driver validates the order and then departs the facility and proceeds toward delivery of the order directly to the customer.

21 Claims, 1 Drawing Sheet

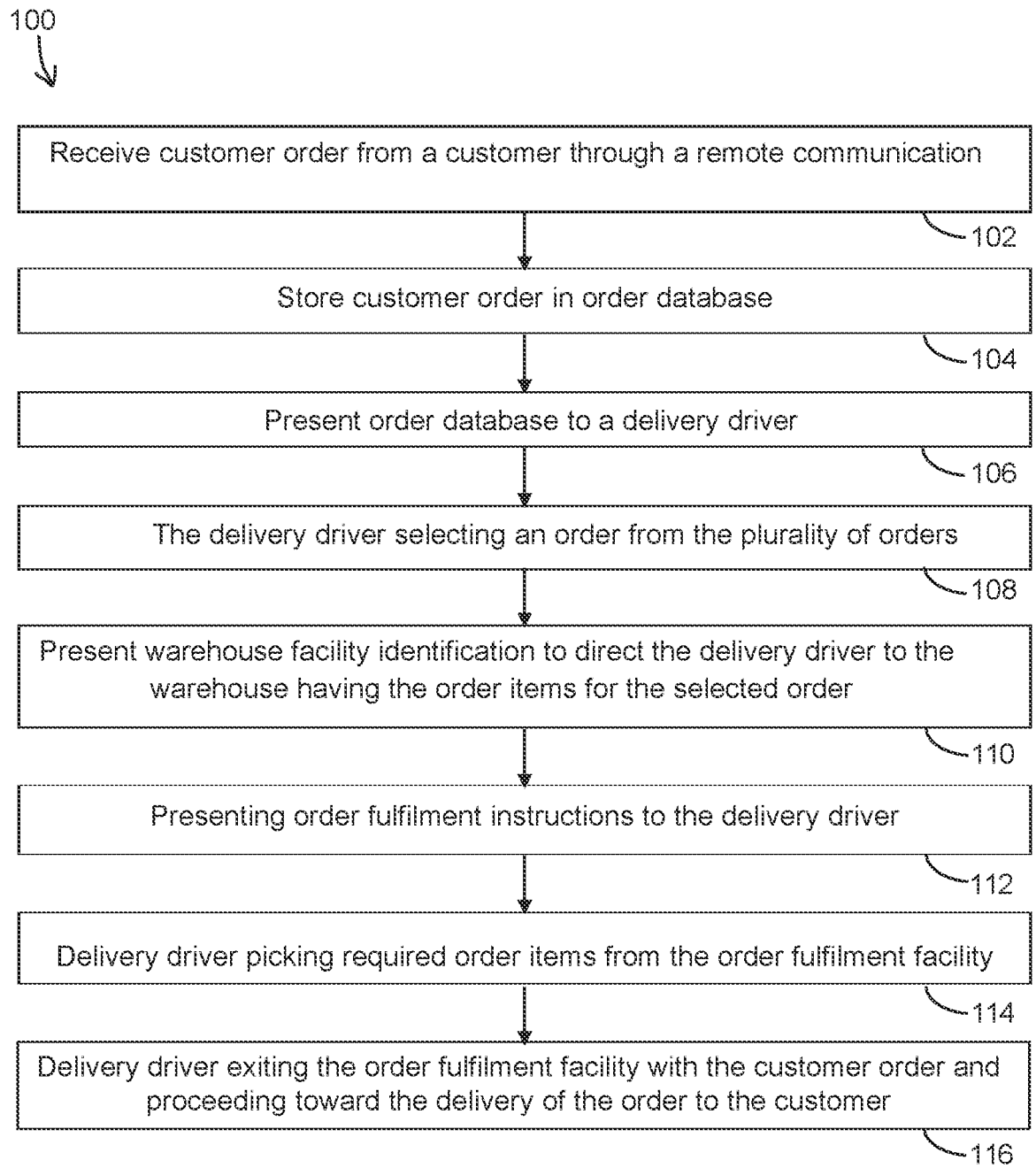

METHOD AND WAREHOUSE FOR DELIVERY ORDER PROCESSING

CROSS REFERENCE TO RELATED APPLICATION

The present application claims priority of U.S. provisional application Ser. No. 63/166,561, filed Mar. 26, 2021, which is hereby incorporated by reference herein in its entirety.

FIELD OF THE INVENTION

The present invention is directed to a method of operating an order fulfilment facility, and in particular an order fulfilment facility utilizing indirect labor.

BACKGROUND OF THE INVENTION

Order fulfillment of orders placed over the Internet must take place within a relatively short period of time in order to be commercially competitive. Such order fulfillment is known as E-commerce and places demands on an order fulfillment system to meet such obligations. This is compounded by the fact that E-commerce usually involves a large number of small orders (each containing as few as one item in the order) that are selected from an inventory with a large number of potential items. Inefficiencies and conflicts arise in warehouses due to the size constraints associated with warehousing and transporting items for order fulfilment, such as the amount of equipment or personal required to carry out an order fulfilment process, the size of the equipment involved, the size of the items to be manipulated, and other factors. Direct to customer food and beverage delivery processes commonly available are associated high labor cost and high employee turnover. Additionally inefficiencies and conflicts arise when a customer must make multiple separate orders to select all of the items they desire, such as placing orders at two or more convenience stores, grocery stores, restaurants, etc. Customers may place orders with a particular vendor (e.g. restaurant, grocery store, etc.) and a freelance worker or driver (commonly referred to as a "gig worker") may select a customer order, retrieve the order, and deliver the order to the customer.

SUMMARY OF THE INVENTION

The present invention provides a system and method for operating an order fulfilment warehouse or facility, such as a food and beverage distribution warehouse utilizing a gig-based labor force (e.g. freelance delivery drivers) to perform picking functions in the warehouse and to also deliver the order to the customer. The system and method may be referred to as a zero labor fulfilment center, because the fulfilment or picking functions are performed by a gig-based labor force and not a dedicated onsite labor force. Preferably, the facility is staffed with only supervisory labor and receiving/putaway labor which replenish the inventory/SKUs within the warehouse as they are depleted by the delivery drivers. The delivery driver can access an order database via a remote connection to accept a customer's online order, such as for a restaurant pickup and/or a grocery item(s) order. The grocery order may be from a limited or dedicated warehouse facility that has a curated group of items/SKUs. In some preferred embodiments, upon arrival, the delivery driver would enter the warehouse and be checked in (and optionally sanitized) by a supervisory staff member and then proceed to picking the order from the warehouse. The picker/driver then departs the facility and may proceed to deliver the order directly to a waiting customer.

The method for order picking utilizing freelance delivery drivers may utilize known systems and methods for directing the picking functions of the driver, such as visual cues, optical scanners, pictographic, and/or voice/speech based picking and confirmation processes, for example. This method is also particularly well-suited for third-party logistics (3PL) operations allowing users to completely control their operation and labor costs by simplifying their labor requirements. The method is beneficial in reducing or eliminating the screening and hiring process for fulfilment/picking employees. The gig-workers may be partially trained or recruited to perform many of the core warehousing functions, including product receiving, putaway, cycle count, picking, and validation of orders.

These and other objects, advantages, purposes and features of this invention will become apparent upon review of the following specification in conjunction with the drawings.

BRIEF DESCRIPTION OF THE DRAWINGS

FIG. 1 is a diagram of a method for operating an order fulfilment warehouse and delivering an e-commerce order to a customer with a gig-based labor force, in accordance with the present invention;

DESCRIPTION OF THE PREFERRED EMBODIMENTS

A method and system are provided for fulfilling customer orders placed remotely (via ecommerce over the internet, cloud, automated phone line, etc.) with minimal or no dedicated order picking labor. The method and system utilize gig workers or freelance delivery personal to pick items from an order fulfilment facility, such as a dedicated warehouse. The delivery driver is provided with customer order details and arrives at the required fulfilment facility to pick the items for the customer order. In typical order fulfilment facilities, a dedicated order picker or other fulfilment facility employee or an automated system performs the piece picking function to consolidate the order items for a customer order into a completed order which would be retrieved by a customer or delivery driver. In a preferred embodiment, the delivery driver performs the piece picking functions within the warehouse, thus substantially reducing or eliminating the requirements for a dedicated picking labor force. The method may incorporate commonly known or commercially available online or cloud based delivery applications and commonly known or commercially available order fulfilment systems and processes. The method is particularly well suited for dedicated warehouses that include a pre-selected and consistent set of available items or stock keeping units (SKUs) which a customer may choose from.

Referring to the illustrative embodiment of FIG. 1, a method 100 is provided for operating an order fulfilment warehouse, the warehouse may be fully or partially automated, such as to provide restocking or replenishment functions to replace depleted inventory. Preferably, the warehouse is unaffiliated with retail shopping facilities such that the inventory in the warehouse is dedicated for online or remote orders. The method 100 includes receiving 102 a customer order from a customer through a remote communication, such as from a mobile device based order application or a web-browser based application that communicates with an order fulfilment operating system. For example, the operating system may be cloud based to reduce or eliminate physical data storage and hardware requirements and such that it may be hosted by a third party or external entity apart from the physical warehouse facility. In some embodiments, one entity may utilize the method 100 and provide an inventory system for a third party. For example, a third-party application may not have infrastructure to support a warehouse operation and an entity with sufficient infrastructure may provide the infrastructure for the third-party, while the method 100 coordinates the entity providing the infrastructure with the third-party application.

The customer order is stored 104 in an order database configured to store many customer orders which have been placed by many customers via the application or other ordering process (FIG. 1). The orders in the order database are presented 106 to a delivery driver, such as through a mobile device on the delivery driver's person. The delivery driver is able to select 108 a desired order from the order database, such as based on geographical information provided by a global positioning system. Alternatively, the order fulfilment operating system or the ordering application may automatically select an order from the order database and assign it to a delivery driver whom is actively engaged with the operating system (i.e. working and accepting new delivery jobs). Upon selection of a particular order at 108 by the delivery driver (or automatic assignment), the method 100 includes presenting 110 a warehouse identification, such as in the form of an address or step-by-step direction to the facility, to direct the delivery driver to the warehouse containing the order items required for the selected customer order.

Upon arriving at the warehouse, the delivery driver is presented 112 with order fulfilment or picking instructions to guide the delivery driver for picking the required items for the selected order (FIG. 1). The instructions may include item location information for the required items of the selected customer order. For example, the item location information for each item may include the location of the item within the warehouse, such as at a particle storage rack or within a particular aisle and bay of the warehouse. A supervisory employee may check-in the delivery driver as they arrive at the warehouse, which may include sanitizing the driver if necessary or desired. The delivery driver then moves through the facility to pick 114 the required order items from their respective locations, such as guided by the order fulfillment instructions. The picking operations performed by the delivery driver may be directed by pick-light technology, a handheld device (e.g. a mobile device on the delivery driver's person), auditory commands, pictographs, or other available known picking systems to facilitate efficient picking of the order items. For example, a supervisory employee may enter the order number or information into a tablet that is attached to a cart and the cart provided to the delivery driver when they arrive at the warehouse. The tablet may provide guidance to the delivery driver through the warehouse in a sequential or optimized pattern. The order fulfillment instructions may be presented to the delivery driver with sensory guidance. For example, instruction or guidance may be presented via visual cues, auditory cues, and haptic cues, such as via a heads-up-display device worn by the delivery driver. The picker may scan the picked inventory with a scanning device during the picking process to assure pick accuracy.

Once the delivery driver has retrieved all of the order items (or at least all of the items required at that particular warehouse or all items that are currently available at that warehouse that make up the order), the delivery driver exits 116 the warehouse with the customer order and proceed toward the delivery of the order to the customer. The method 100 may include providing or presenting delivery instructions or guidance to the delivery driver. For example, the order application may present turn-by-turn or global positioning system (GPS) directions to the delivery driver, via the driver's mobile device, to direct the driver to the customer's selected delivery location. By this method 100, the requirements for dedicated order picking labor is substantially reduced or eliminated, because the delivery driver performs most or all of the picking function. It will be appreciated that the delivery driver may perform a complimentary role in the order picking process, as opposed to performing the entire picking process. For example, the driver may pick only selected items from the facility which are not easily handled by automated systems, while automated systems may handle those easily handled items.

In some instances, the customer order may require order items located at more than one order fulfilment facility or "stop" along the delivery driver's route. It is contemplated that the delivery driver makes stops at one or more order fulfilment facilities, including at least one dedicated warehouse, grocery stores, convenience stores, restaurants, home improvement stores, pharmacies, beverage distributors, dispensaries, retailers, and the like, to collect the items ordered by the customer. In this manner, the order fulfilment management system or ordering application directs the delivery driver to each facility that contains portions of the customer's order. And for warehouses that require piece picking operations, the system or application directs the delivery driver to the locations of the required items within the warehouse.

In a preferred embodiment, the order fulfilment facility is a standalone or dedicated warehouse facility that stores a defined number of SKUs which are selectable by the customer within the mobile or browser based application. As an example, the defined SKUs available within the dedicated warehouse may include three types of snack chips, six candy options, five desert options, four soft drink options, and five alcoholic beverage options. In this exemplary warehouse, the limited SKUs available simplify the ordering process by reducing the options that a customer must choose from and simplifies the operation of the warehouse by reducing the SKUs that must be replenished and reducing the SKUs that a delivery driver must choose from to pick the customer's order items.

Thus, the method and system provide for improved efficiency and labor management in preparing and delivering customer orders that have been placed remotely by the customer. The delivery drivers provide the picking labor to consolidate customer order items from a warehouse of inventory items, and thus, a dedicated labor force is not required to perform picking functions within the warehouse. The method provides for a customer to seamlessly order items from multiple disparate locations or facilities in a local region and have those items delivered at the same time by a single delivery driver.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A method for operating an order fulfilment warehouse, said method comprising:
   receiving a subject customer order from a customer through a remote communication;
   storing the customer order in an order database configured to store a plurality of customer orders;
   assigning a customer order from the order database to a delivery driver;
   presenting order fulfilment warehouse identification information for directing the delivery driver to the order fulfilment warehouse containing order items required for the assigned customer order;
   upon the delivery driver arriving at the order fulfilment warehouse, presenting order fulfilment instructions to the delivery driver, wherein the order fulfilment instructions comprise item location information for locations of the required items of the assigned customer order within the order fulfilment warehouse;
   the delivery driver picking the required order items from their respective locations in the order fulfilment warehouse based on the order fulfilment instructions; and
   the delivery driver exiting the order fulfilment warehouse with the customer order and proceeding toward the delivery of the order to the customer by operating a vehicle to travel on roads between the order fulfilment warehouse and an order delivery destination.

2. The method of claim 1, wherein said assigning a customer order comprises presenting the order database to a delivery driver and the delivery driver selecting an order to process from the plurality of orders.

3. The method of claim 2, wherein the selected customer order comprises an order having order items located at more than one order fulfilment warehouse.

4. The method of claim 1, wherein the assigned customer order requires items from another facility comprising one chosen from a grocery store, a convenience store, a restaurant, a home improvement store, a pharmacy, a beverage distributor, and a dispensary.

5. The method of claim 1, wherein the order picking operations within the order fulfilment warehouse are performed substantially by delivery drivers such that dedicated order picking operators are not required to fulfil customer orders.

6. The method of claim 1, wherein said presenting order fulfilment instructions comprises presenting sensory guidance to the delivery driver comprising at least one chosen from visual cues, auditory cues, and haptic cues.

7. The method of claim 1, wherein said presenting order fulfilment instructions comprises presenting information to the delivery driver with a heads-up-display device.

8. A method for operating an order fulfilment warehouse and delivering an e- commerce order to a customer with a gig-based labor force, said method comprising:
   enabling an order application at a customer's remote computing device;
   a customer placing a customer order through the order application for items at the warehouse;
   storing the customer order in an order database that is accessible by the order application and an order fulfilment operating system at the warehouse;
   a gig-based delivery driver selecting a customer order from the order database through the order application at a remote computing device of the delivery driver;
   directing the delivery driver to the warehouse;
   presenting picking instructions to the delivery driver at the warehouse;
   picking, with the delivery driver, the items for the selected customer order from the warehouse;
   presenting delivery instructions to the delivery driver through the order application; and
   transporting, with the delivery driver, the items for the selected customer order to the customer for delivery.

9. The method of claim 8, wherein the picking instructions comprise item location information for locations of the required items of the selected customer order within the warehouse.

10. The method of claim 8, wherein the selected customer order comprises an order having items located at more than one order fulfilment warehouse.

11. The method of claim 8, wherein the selected customer order requires items from another facility comprising one chosen from a grocery store, a convenience store, a restaurant, a home improvement store, a pharmacy, a beverage distributor, and a dispensary.

12. The method of claim 8, wherein the order picking operations within the warehouse are performed substantially by delivery drivers such that dedicated order picking operators are not required to fulfil customer orders.

13. A method for operating an order fulfilment warehouse and delivering an e-commerce order to a customer by a freelance gig-worker, said method comprising:
   receiving a customer order from a customer through a remote communication by the customer;
   storing the customer order in an order database configured to store a plurality of customer orders;
   assigning a customer order from the order database to a freelance gig-worker;
   granting the freelance gig-worker access to the order fulfilment warehouse by checking-in the freelance gig-worker into the order fulfilment warehouse upon the freelance gig-worker arriving at the order fulfilment warehouse, wherein the order fulfilment warehouse comprises a non-retail facility;
   presenting order fulfilment instructions to the freelance gig-worker via a mobile computer device that directs the freelance gig-worker to pick goods stored in the order fulfilment warehouse associated with the customer order;
   directing the freelance gig-worker to deliver the picked goods to the customer by providing delivery instructions comprising driving directions for the freelance gig-worker to drive a vehicle on roads to a delivery location remote from the order fulfilment warehouse.

14. The method of claim 13, wherein said assigning the customer order from the order database to the freelance gig-worker comprises assigning the customer order to the mobile computer, wherein the mobile computer device is associated with the freelance gig-worker.

15. The method of claim 14, wherein said assigning the customer order from the order database to the freelance gig-worker comprises presenting the order database to the freelance gig-worker via the mobile computer device and allowing the freelance gig-worker to select the customer order.

16. The method of claim 13, wherein said directing the freelance gig-worker to deliver the picked goods to the customer by providing delivery instructions comprises providing delivery instructions to the mobile computer device for display to the freelance gig-worker.

17. The method of claim 13, wherein prior to said allowing the freelance gig-worker access to the order fulfilment warehouse, said method further comprises directing the freelance gig-worker to the order fulfilment warehouse by providing driving directions for the freelance gig-worker to drive the vehicle on roads to the order fulfilment warehouse.

18. The method of claim 17, wherein said directing the freelance gig-worker to the order fulfilment warehouse by providing driving directions comprises providing driving instructions to the mobile computer device for display to the freelance gig-worker.

19. The method of claim 13, wherein the order fulfilment warehouse is fully automated or partially automated for restocking or replenishment of pickable goods.

20. The method of claim 13, wherein said presenting order fulfilment instructions to the freelance gig-worker via a mobile computer device comprises providing item location information for locations of the required items of the assigned customer order within the order fulfilment warehouse.

21. The method of claim 13, wherein said granting the freelance gig-worker access to the order fulfilment warehouse by checking-in the freelance gig-worker into the order fulfilment warehouse comprises checking-in the freelance gig-worker by an employee of the order fulfilment warehouse.

\* \* \* \* \*